UNITED STATES PATENT OFFICE.

HARRY O. ANDERSON, OF WORCESTER, MASSACHUSETTS, ASSIGNOR TO NORTON COMPANY, OF WORCESTER, MASSACHUSETTS, A CORPORATION OF MASSACHUSETTS.

TREATMENT OF GRANULAR ALUMINOUS MATERIALS.

1,400,495. Specification of Letters Patent. Patented Dec. 13, 1921.

No Drawing. Application filed March 30, 1921. Serial No. 457,096.

*To all whom it may concern:*

Be it known that I, HARRY O. ANDERSON, a citizen of the United States of America, residing at Worcester, in the county of Worcester and State of Massachusetts, have invented certain new and useful Improvements in the Treatment of Granular Aluminous Materials, of which the following is a full, clear, and exact specification.

My invention relates to a method of treating granular aluminous materials for the purpose of increasing their capillarity, and more especially to the treatment of crystalline alumina which is to be used in the preparation of various refractory and abrasive products.

Heretofore the treatment of abrasive and refractory materials with alkalis or alkaline solutions has been employed, as described in U. S. Patent No. 944,436 to Jeppson and Higgins, by which crystalline aluminous material is subjected to the action of sodium hydroxid and sodium carbonate at an elevated temperature, then washed free from alkali and dried. This treatment increases the capillarity between the granules to an appreciable extent, and since the strength with which a bond will hold such granules together depends upon or varies with their capillarity, in general the molding properties of mixtures in which they are incorporated are improved and a stronger article results when the grains have been treated in this way.

However, it has been found that such treatment is oftentimes ineffective and that it does not sufficiently improve the working properties of the grains to render them easy of manipulation as in polishing, or the articles made from them as strong as may be desired. Even by varying the concentrations employed in such cases, a satisfactory result is often not obtainable. It is also imperative that the alkali be thoroughly removed, for if some remains upon the grains, it will have a deleterious effect upon bonding materials which may be used, such as glue.

It is therefore an object of my invention to provide a method of increasing the capillarity and improving the general working properties of aluminous refractory or abrasive materials, beyond the limits to which they may be carried by methods which have thus far been known. Further objects of my invention will be apparent from the following disclosure.

In accordance with my invention, I treat granular crystalline aluminous material, either natural or artificially prepared, such as corundum or electrically fused bauxite, with a silicate of an alkali metal, in fused condition or in solution, until the desired bonding properties have been obtained. I have, moreover, established the fact that by increasing the temperature or the concentration of the silicate solution at which it is in contact with the grains, the ultimate capillarity of the grains may be increased and that by regulating these conditions the final results desired may be controlled. A part or all of the silicate left on the grains may be removed by lixiviation, if desired.

Various soluble silicates may be used and more concentrated solutions may be employed, but in one application of my invention, I prefer an aqueous solution containing ordinarily from 1 to 10% of sodium silicate. Sodium silicate may be considered as having the formula $Na_2SiO_3$, but as is well known, the ratio of soda ($Na_2O$) to silica ($SiO_2$) may vary within extremely wide limits. Silicate of sodium having any ratio of soda to silica is to be considered as representative of any silicate which is or may be rendered soluble in water and as within the scope of this specification and the appended claims.

In one adaptation of my invention which is representative of its operation and results, I proceed as follows: Crystalline aluminous material, such as is produced by fusing bauxite containing alumina and various other ingredients in the electric furnace, is obtained in the form of a large solid lump or pig sometimes weighting several tons. This is broken and then crushed by passing between rollers until it is reduced to comparatively small lumps or particles. In this form the loose material is known as grain. It is usually screened to particular mesh sizes, although this is not necessary to the successful operation of my invention, for it may be treated as a mixture of grain sizes with equal success. In either form it is immersed in a solution, made from water and about 6% by weight of a solution of sodium silicate having a specific gravity of 60° Baumé and the $Na_2O:SiO_2$ ratio approximately 1:2, and agitated in contact with it for a sufficient time for the grain to become thoroughly treated.

In order to increase the capillarity to be exhibited by the treated grain, the temperature of the silicate solution is raised, as by a steam coil or steam jacket around the vessel in which it is contained during this part of the treatment, and it may be carried as high as the boiling point of the silicate solution if desired. The same result may also be effected by previously heating the grain and adding the silicate solution at ordinary temperature, but this is less convenient in manipulation. After it has been allowed to act upon the grain for a sufficient length of time, which is usually about an hour, the silicate solution is drawn off. The grain may be used in this condition in case it is not necessary to remove the silicate clinging to it. Otherwise the undesired excess of silicate is removed from the grains by lixiviation in any convenient way with water. It is then dried by passing over heated drums or by any convenient method, of which many are in common practice.

The grain thus prepared may be employed to good advantage for various purposes and the results obtained are more satisfactory. If wet mixtures are to be made from the treated grain, it may be used directly without drying, mixed with the bonding materials to be employed, molded, dried and fired or set, according to the particular method involved. For example, a vitrified grinding wheel may be made by mixing the treated grain with suitable clay material and water, forming the molded article from the plastic mass, drying and thereafter firing it in a ceramic kiln in accordance with well known ceramic operations to vitrify or fuse the clay material in intimate contact with the grains and to bond the same into a unitary structure. Or it may be used in making a set-up wheel by coating the peripheral surface with glue, applying an even layer of the treated grain and drying until the glue has hardened sufficiently to hold the grain, which it does much more tenaciously when the grain has been treated in this fashion.

Grain treated in this fashion exhibits a higher degree of capillarity than when treated by the methods heretofore used and in instances where it would otherwise be unsuitable for the purpose, this treatment renders it entirely satisfactory. The working properties of mixtures made from bonding materials such as glue, clay, gum tragacanth, etc., and grains which have been thus treated, are much better than when made with untreated grains or with material which has been treated with solutions of alkalis, such as sodium hydroxid. Moreover, if silicate is left upon the grains, it does not seriously affect the bonding properties nor react detrimentally with the bonding materials themselves, whereas when alkalis are used, as in previous methods, the alkali will not only coat the surfaces of the grains but actually attack the bonding materials, such as glue for example, and lessen its bonding properties.

The effect of this treatment upon the grains is well marked, but it is not understood what reactions may take place in this method of treatment,—whether they be chemical or physical, or whether there be any action upon the grain beyond that of cleaning its surfaces of fine particles and impurities, hence the claims are to be interpreted without reference to any particular theory of operation. Other applications and modifications that may be made of my process will be apparent from my disclosure to chemists and those skilled in the ceramic art, but such modifications are to be considered as embodied in this specification and in the following claims.

Having thus described my invention, what I claim as new and desire to secure by Letters Patent is:

1. The method of treating crystalline aluminous material which comprises the step of subjecting such material in a suitable state of subdivision to the action of a silicate of an alkali metal.

2. The method of treating crystalline aluminous material which comprises the steps of crushing such material to a granular form and subjecting it at an elevated temperature to the action of a silicate of an alkali metal.

3. The method of treating crystalline aluminous material which comprises the step of subjecting such material in a suitable state of subdivision to a solution of a soluble silicate of sodium.

4. The method of treating crystalline aluminous material which comprises the steps of subjecting such material suitably subdivided to an aqueous solution of a soluble silicate of sodium and later removing this solution from said material by lixiviation.

5. The method of treating crystalline alumina grain which comprises the steps of subjecting the grain to a solution of soluble sodium silicate and thereafter drying the treated grain.

6. The method of treating crystalline aluminous grain which comprises the steps of subjecting such grain to the action of a silicate of an alkali metal, removing the excess of said silicate from the grain and thereafter bonding the grain into a unitary structure.

7. The method of treating crystalline alumina grain which comprises the steps of subjecting such grain to a dilute solution of a silicate of sodium at elevated temperatures and later removing the excess of said silicate solution from the grain by washing with water and thereafter drying the grain.

8. The method of treating crystalline alumina grain which comprises the steps of subjecting such grain to an aqueous solution containing from 1 to 10% of sodium silicate of approximately the formula $Na_2O.2SiO_2$, heating the solution to an elevated temperature and later washing the grain with water to remove the excess of silicate therefrom.

Signed at Worcester, Massachusetts, this 29th day of March, 1921.

HARRY O. ANDERSON.